United States Patent
Worden et al.

(10) Patent No.: US 10,633,154 B2
(45) Date of Patent: Apr. 28, 2020

(54) COMBINATION CAP AND WORK SUPPORT SYSTEM

(71) Applicant: Preddis LLC, Everett, WA (US)

(72) Inventors: Michael Worden, Everett, WA (US); Nathaniel Hallee, Minneapolis, MN (US); George Stickler, Shorewood, MN (US)

(73) Assignee: PREDDIS, LLC, Everett, WA (US)

( * ) Notice: Subject to any disclaimer, the term of this patent is extended or adjusted under 35 U.S.C. 154(b) by 98 days.

(21) Appl. No.: 15/933,632

(22) Filed: Mar. 23, 2018

(65) Prior Publication Data

US 2018/0251276 A1    Sep. 6, 2018

Related U.S. Application Data

(63) Continuation-in-part of application No. 14/269,536, filed on May 5, 2014, now Pat. No. 9,957,092.

(51) Int. Cl.
| | |
|---|---|
| *B65D 51/24* | (2006.01) |
| *B65D 43/02* | (2006.01) |
| *B65D 83/40* | (2006.01) |
| *B29D 99/00* | (2010.01) |
| *B05B 13/02* | (2006.01) |
| *B05C 11/10* | (2006.01) |

(52) U.S. Cl.
CPC .............. *B65D 51/24* (2013.01); *B05B 13/02* (2013.01); *B05B 13/0285* (2013.01); *B05C 11/10* (2013.01); *B65D 43/0214* (2013.01); *B65D 83/40* (2013.01); *B29D 99/0096* (2013.01)

(58) Field of Classification Search
CPC ..... B65D 83/40; B65D 51/32; B65D 21/0235
See application file for complete search history.

(56) References Cited

U.S. PATENT DOCUMENTS

| | | | | |
|---|---|---|---|---|
| 2,737,416 | A | * | 3/1956 | Behr ...................... B65D 83/40 239/121 |
| 3,016,169 | A | | 2/1958 | Kirshenbaum |
| 2,873,052 | A | | 2/1959 | Atherton |
| 2,898,943 | A | | 8/1959 | Kennedy |
| 2,955,722 | A | | 10/1960 | Antonious |
| 3,090,067 | A | * | 5/1963 | Weiby .................... B65D 51/24 15/236.02 |
| 3,221,955 | A | | 12/1965 | Banaszak |
| 3,322,262 | A | * | 5/1967 | Puente ............... B65D 21/0223 206/398 |
| 3,433,380 | A | | 3/1969 | Kawchitch |
| 3,464,579 | A | * | 9/1969 | Asenbauer ......... B65D 21/0223 220/4.21 |

(Continued)

*Primary Examiner* — Andrew T Kirsch
(74) *Attorney, Agent, or Firm* — Ahab S. Ayoub; Ayoubip.com

(57) ABSTRACT

A combination cap and work support system includes a lower section configured to connect to a container and an upper section configured to provide a desired support to an object. The upper section includes multiple apices and at least one ridge. The system may be included as part of a kit that includes a container and may include applicators and other accessories. The system may be manufactured with various molding processes, including multi-shot molding and multi-cavity molds. The system may be utilized by placement upon a work surface and then placing an object upon an apex or ridge thereof, to support the object above the work surface.

26 Claims, 10 Drawing Sheets

(56) References Cited

U.S. PATENT DOCUMENTS

| | | | |
|---|---|---|---|
| 3,616,943 A * | 11/1971 | Brink | B65D 21/0235 |
| | | | 206/508 |
| 3,811,606 A | 5/1974 | Higgins | |
| 3,815,736 A | 6/1974 | Sedlak | |
| 3,940,100 A | 2/1976 | Haug | |
| 4,182,405 A * | 1/1980 | Hysen | A47G 19/26 |
| | | | 165/48.1 |
| 4,225,064 A | 9/1980 | Westcott | |
| 4,469,235 A | 9/1984 | Parker | |
| D276,595 S | 12/1984 | Miller | |
| 4,733,790 A | 3/1988 | Stein | |
| D345,833 S | 4/1994 | Truran | |
| 5,395,086 A | 3/1995 | Goldstein | |
| D369,975 S | 5/1996 | Simon | |
| D379,302 S | 5/1997 | Rodman | |
| 5,704,502 A | 1/1998 | Greenfield | |
| 5,749,486 A | 5/1998 | Porter | |
| 7,222,741 B2 | 5/2007 | Chmela | |
| 7,891,635 B2 | 2/2011 | Rowland | |
| 2002/0000388 A1 | 1/2002 | Frisk | |
| 2003/0136699 A1* | 7/2003 | McNeeley | B65D 21/02 |
| | | | 206/518 |
| 2006/0144071 A1 | 7/2006 | Rowland | |

\* cited by examiner

COMBINATION CAP AND WORK SUPPORT SYSTEM

CROSS-REFERENCE TO RELATED APPLICATIONS

This application is a continuation-in-part of co-pending U.S. patent application Ser. No. 14/269536 entitled "COMBINATION CAP AND WORK SUPPORT SYSTEM" filed May 5, 2014, which is a continuation-in-part of co-pending U.S. patent application Ser. No. 14/268056 entitled "COMBINATION CAP AND WORK SUPPORT SYSTEM" filed May 2, 2014, both of which are hereby incorporated by reference.

BACKGROUND OF INVENTION

Field of the Invention

The invention relates generally to an improved multifunctional cap for a can.

Background Art

Surface coatings such as paints, varnishes, sealants, and lubricants are commonly applied to objects via spray, brush or roller devices. Often, such coatings require significant drying times, and it is generally desirable to minimize contamination of a work surface or surrounding objects by unintended contact with such coatings. Wet surface coatings may also cause unintended and undesirable adhesion of an object to a work surface or other items, which may damage the work surface, the object, and/or the coating.

Additionally, access to all of the various surfaces of the object, during application of the surface coating, may pose a challenge. For example if an object to be coated is placed on a flat work surface, the lower edges and bottom side(s) of the object may be relatively inaccessible for application. In practice, this often means that such coatings must be applied in two phases, with the second occurring only after the first surfaces have dried and the object can be rotated for application to the other surfaces. This is generally an inefficient practice.

Tabletop support stand systems have been developed to support an object during application of a surface coating. Generally, it is desirable that such systems provide a high degree of stability, with a minimal degree of contact with the object surface, so as not to interfere with the application process, as well as to permit shortened drying times via air circulation around the drying surfaces.

One such system is the Painter's Pyramid® by K&M of VA, Inc. As shown in prior art FIG. 1A, such pyramidal designs have a single apex configuration with triangular sides. Certain configurations of the pyramidal stands are also configured to interlock in a manner that allows them to support non-planar objects such as rods or spheres between multiple pyramids. Other prior art approaches include the cone-like devices of, e.g., US Design Patents Nos. D642447, D668,933, and D672,222 by Bucci shown in FIG. 1B, and the cubic and spherical configurations disclosed in U.S. Pat. No. 8,347,811, also by Bucci.

Another example of a small work surface stand is the Bench Cookie® and attachable cones and bridges by Rockier®. As shown in prior art FIGS. 2A-2B these comprise a system of circular stackable pucks, used with a cone clip and/or bridge clip that provides a contact point for an object to be supported. The pucks and clip-on elements may be utilized in multiple configurations to provide similar functionality to that of the pyramid devices.

The prior art work stand devices described herein typically must be separately purchased and utilized in multiples as they are individually incapable of supporting an object. In addition to the costs involved in purchasing multiples of each, this limitation also requires that the supported object generally have a contact surface that is significantly greater than the diameter of the stand, as it must span multiple stands since such stands are not individually configured to support an object. Accordingly, there exists a need for an inexpensive small work surface stand capable of individually supporting a variety of objects and providing an increased stability, whether used alone or in multiples.

Many surface coatings, lubricants and other sprayable products, are stored, sold and applied via spray cans with the aid of aerosol propellants, or atomizer pumps. As shown in prior art FIG. 3, spray cans 310 are commonly cylindrical and the contents are generally dispersed by means of a spray assembly, comprising a dip tube 312 connected at its upper end to a valve or pump that is operated by means of an actuator, or button 314. The button will typically be operatively connected to the dip tube and include a nozzle for dispersal of the product.

To prevent accidental dispersal of the product, many spray cans include a cap to restrict access to the actuator, and/or a means of locking the actuator so that it may not be accidentally depressed. The cap may be in the form of a cover that completely encloses the actuator, or an open-style cap that surrounds a portion of the actuator to restrict accidental activation. Open-style caps are typically not removed from the can during use, but may be configured to rotate and lock the actuator, to prevent accidental activation of the actuator.

Once their primary function of sealing a can or protecting an actuator has ended, caps/lids are generally discarded. Thus, because large quantities of these items are disposed of each year due to their limited utility, there exists a large and unmet need for a cap having additional utility, thereby creating additional value to the seller and consumer, and decreased environmental impact of disposal by encouraging the reuse of such caps.

SUMMARY OF INVENTION

In one aspect, the invention relates to a combination cap and work support system that is configured at a lower end to reversibly connect to a predetermined container configuration, and at an upper end to provide a predetermined support system for supporting objects during application of a surface coating or other project.

The combination cap and work support system may be configured to be reversibly fastened to a work surface, and to support various types, configurations, quantities, and masses of objects. It will generally be configured with a plurality of ridges and apices, for providing a desired contact surface with an object.

The combination cap and work support system may be configured to separate into a number of segments which are capable of individually functioning as a work support element.

The combination cap and work support system may be packaged as a component of a kit, in conjunction with a can, one or more weighted and/or rotating bases, and one or more combination cap and work support components.

The combination cap and work support system may be manufactured in a single or multi-shot mold, as well as in a multi-cavity mold to produce multiple products simultaneously. Multiple materials may be used in each mold.

Other aspects and advantages of the invention will be apparent from the following description and the appended claims.

DETAILED DESCRIPTION

Figure 1A:
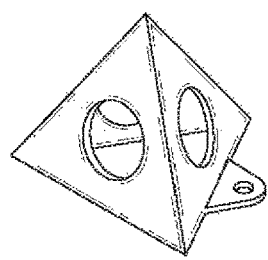
FIGS. 1A-1B show a prior art pyramid-style stand.
Figure 1B:
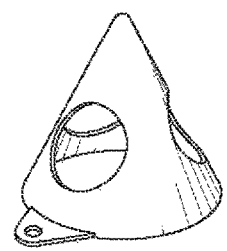
Figure 2A:
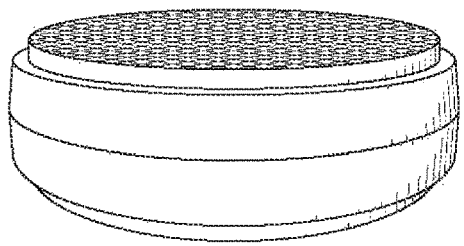
FIGS. 2A-2B show a prior art puck-style stand.
Figure 2B:
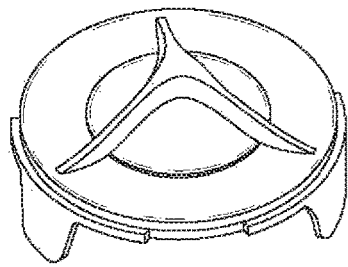
Figure 3:
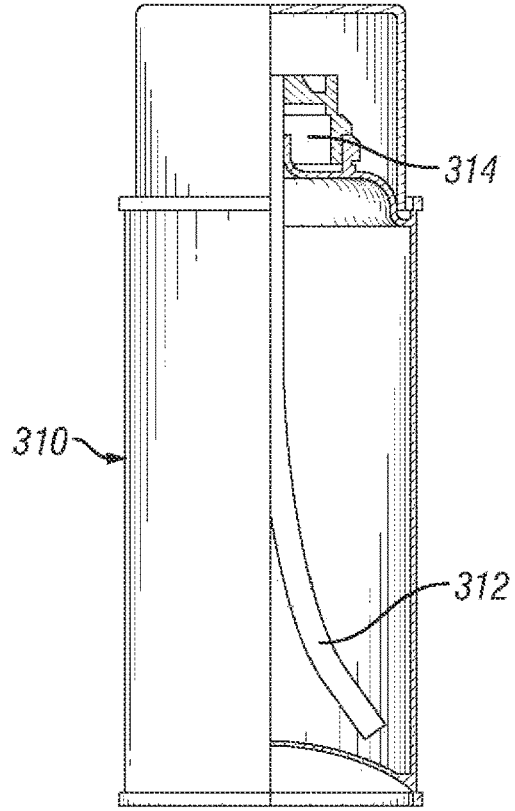
FIG. 3 shows a cutaway view of a prior art spray can and cap.
Figure 4:
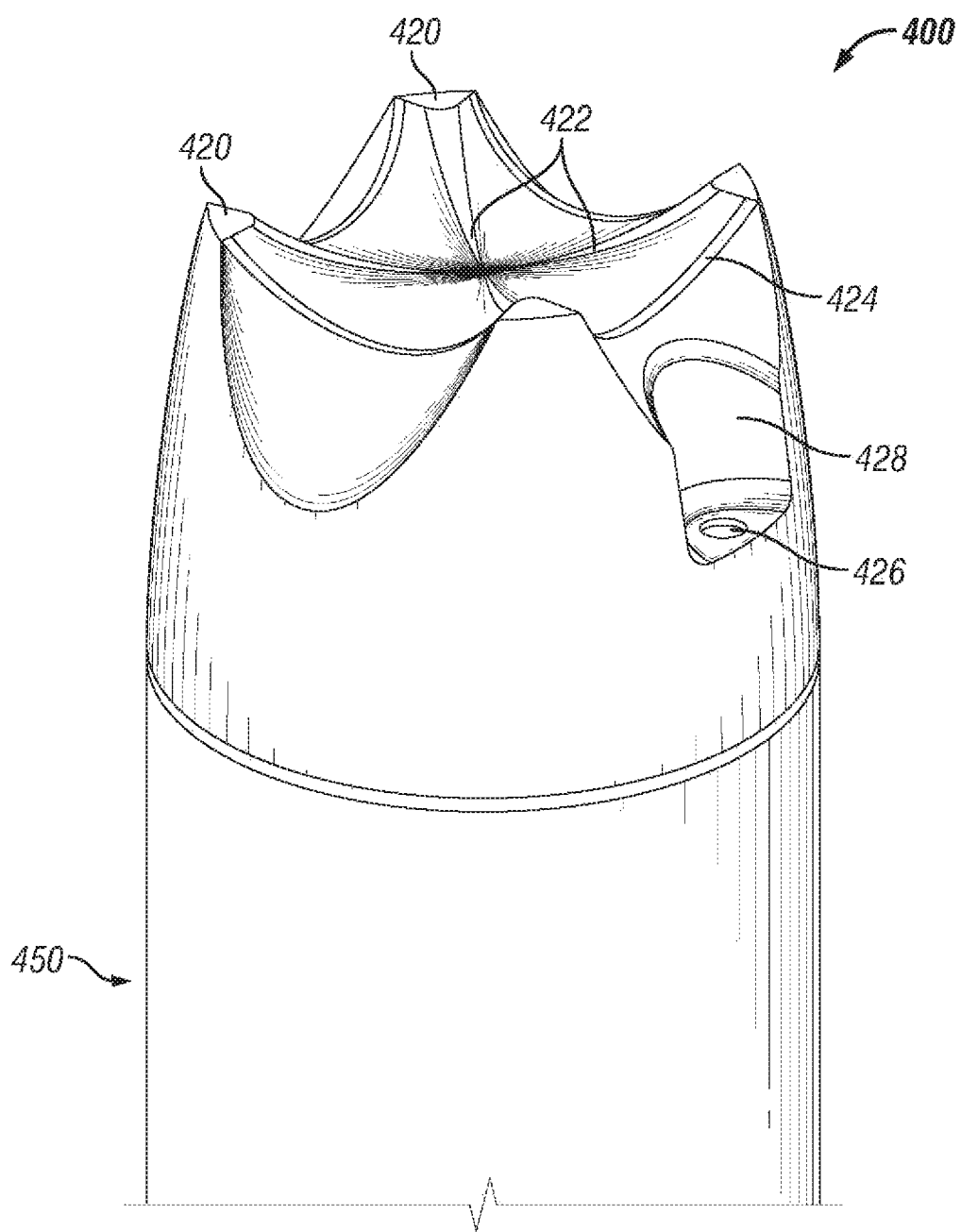
FIG. 4 shows one embodiment of an improved multifunctional cap, having four apices.

As shown in FIG. 4, one embodiment of a combination cap and work support, (also identified herein as an improved multifunctional cap or "IMC") 400 comprises a lower region configured to reversibly connect to an upper rim of a can or similar container. An upper region of the IMC 400 is configured to provide a number of support and stability features when the IMC 400 is disposed between a supported object and a work surface such as a table, workbench, or floor, as will be discussed in further detail below.

A number of apices 420 having a generally uniform height, may be configured with either a relatively flat top, or a pointed top. A relatively flat top advantageously provides greater stability to an supported object, while a pointed top provides a decreased contact area, as may be desirable when applying a surface coating to a supported object. Configurations may also include a textured surface, surface coatings and/or elastomeric materials to prevent slippage of a supported object. The areas between the apices 420 will generally be lower, and in certain embodiments may be configured to cradle an object, as will be further described in detail below.

In the embodiment of FIG. 4, the IMC 400 includes a plurality of radial ridges 422 extending from the apices 420. A predetermined set of radial ridges 422 may have a uniform configuration, thereby advantageously providing an increased stability to a supported object when disposed between the apices 420, and upon the radial ridges 422, as will be later shown and described.

Figure 5A:
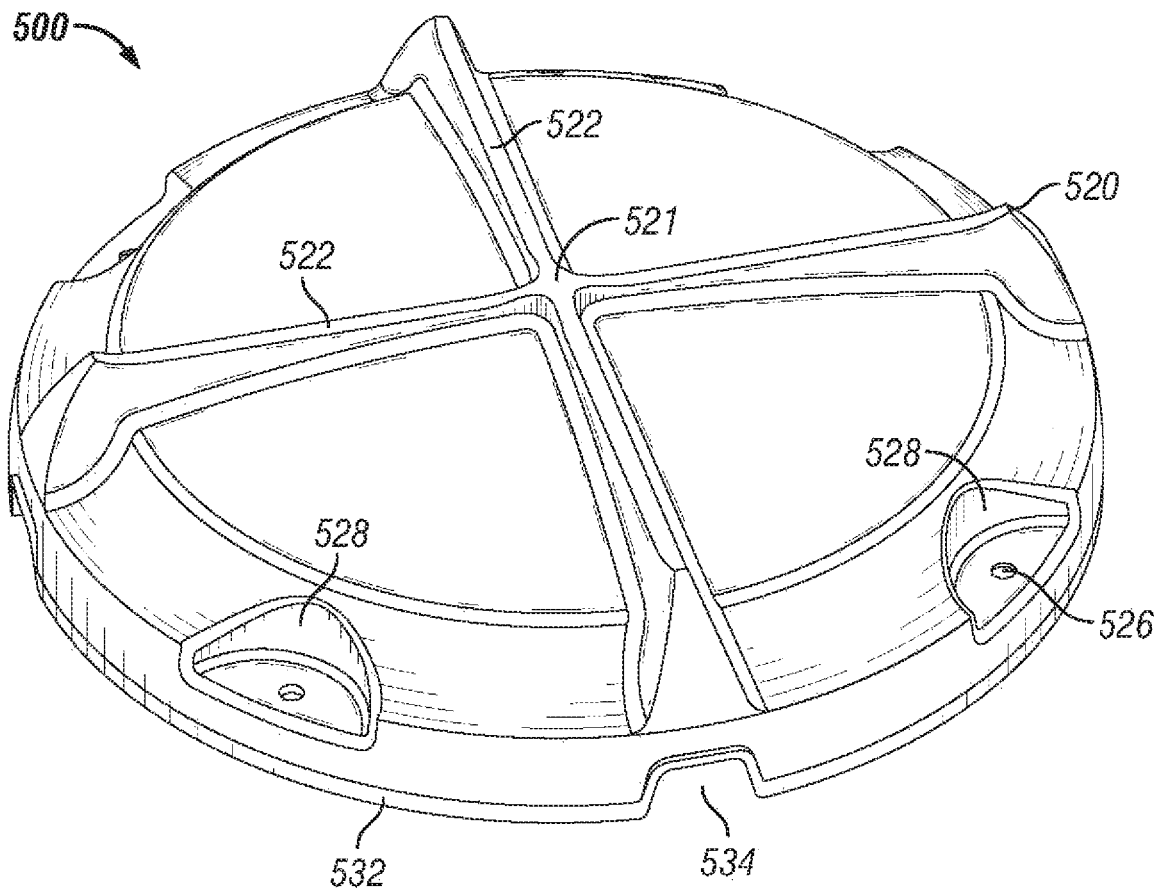
FIGS. 5A-5B show one embodiment of an improved multifunctional cap, having four radial ridges with peripheral apices and a central apex.
Figure 5B:
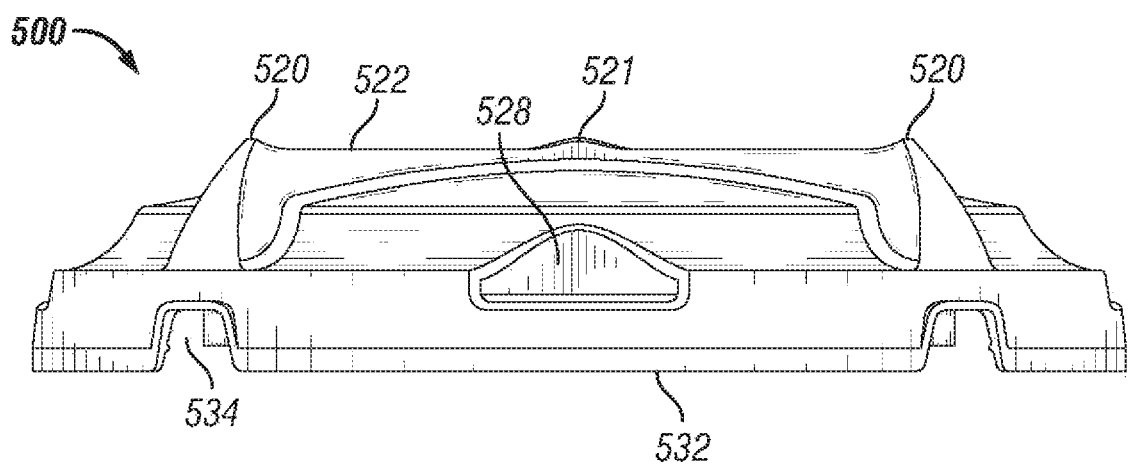

Radial ridges 422 may span only a portion of the radius of the IMC 400, or alternatively may extend from the center of the IMC 400 substantially to the periphery. As shown in the embodiments of FIGS. 5A-5B, a plurality of radial ridges 522 may extend outwardly from the center of the IMC 500 towards a periphery thereof. Each radial ridge 522 includes a peripheral apex 520. A central apex 521 operatively connects each radial ridge 522 at the center of the IMC 500.

As shown in FIG. 5B, the apices 520, 521 may each have a substantially identical height, advantageously providing uniform contact points for a supported object, while minimizing a contact surface with such an object. Embodiments having a plurality of paired apices 522 may be configured such that differing pairs of apices 522 have differing heights/configurations from those of other pairs of apices 522, advantageously providing the capability to support one or more objects at differing heights.

Alternatively, objects may be supported by their ends or corners upon the body or ridges 522 of the IMC 500 when increased stability is desired. When placed upon the IMC 500 body between the ridges 522, an object will be prevented from sliding by the radial ridges 522 which will restrict lateral movement of the object. Similarly, placement upon the ridges 522 between apices (e.g., between 520 and 521) will similarly restrict displacement. In one embodiment, apices 520, 521 will be substantially equidistant from each other.

Figure 6:
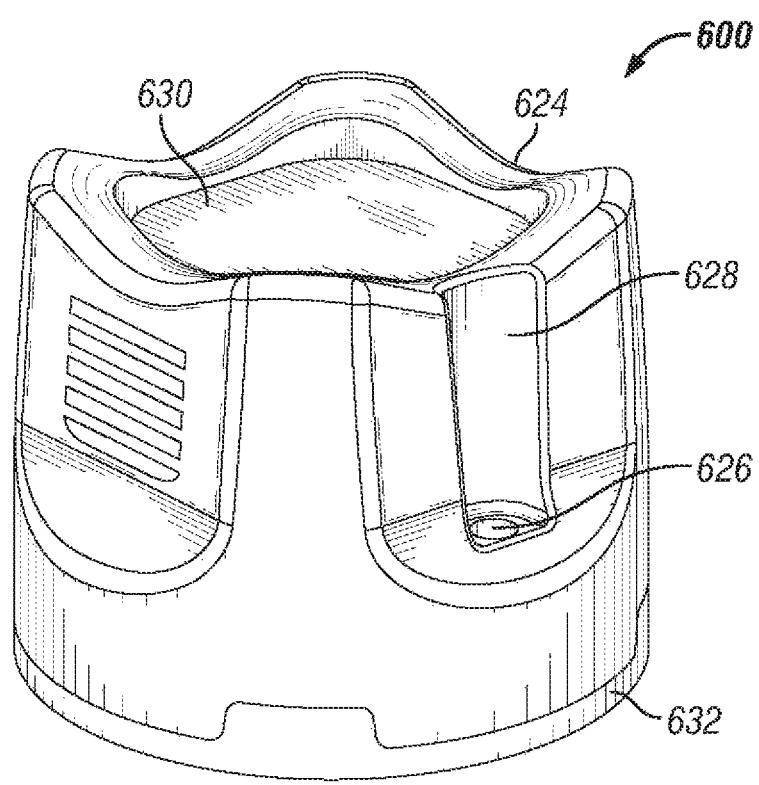
FIG. 6 shows one embodiment of an improved multifunctional cap, having a pair of radial ridges separated by a cradle.

Referring again to FIG. 4, in one embodiment, one or more peripheral ridges 424 may be disposed between a pair of apices 420, either in combination with radial ridges 422 as shown in FIG. 4, or as shown in the embodiment of FIG. 6, with only peripheral ridges 624. Ridges, in addition to the functional support characteristics described herein, may also advantageously provide additional strength and rigidity to the IMC, to lessen the likelihood of failure when supporting heavier objects. In one embodiment, ridges may be extend through the body of the IMC to contact a work surface, thereby advantageously providing an increased strength and stability to the IMC.

Embodiments of the IMC 500 may also include one or more fastening points 526, such as an indent or hole. Fastening points 526 are configured to accommodate the positioning and passage of a fastener such as a nail or screw at predetermined locations, without excessive damage to the IMC 500. Fastening the IMC 500 to a work surface will advantageously increase the stability of the IMC 500 in use. Additionally, these permit the IMC to be stably affixed to sloped or vertical surfaces. In ridged embodiments having a sloping ridge, one or more higher points of the ridge will form at least one apex. In one embodiment, the combination of ridges and apices combine to form a cradle configuration to advantageously support non-planar objects with increased stability by biasing such objects towards the center of the IMC. The cradle configuration may comprise curved ridges, as shown in FIG. 4, for more stably supporting objects with curved surfaces (e.g., rods or spheres), or a generally planar bottom, as shown in the embodiment of FIG. 5, for more stably supporting objects with planar surfaces, or a combination of the two. Ridges may be coated or formed of an elastomeric or other material based on an anticipated use.

In embodiments with multiple cradles, it may be advantageous to include combinations of cradles having an identical configuration to ensure that a supported object will be maintained in a horizontal orientation when supported by the cradles. For example, in an embodiment having four apices and four cradles disposed between, each pair of opposite cradles may have a matching configuration that differs from the matching configuration of the other pair of cradles. Such embodiments would advantageously provide different height placement locations for a supported object, and in some applications may be capable of supporting two perpendicularly-placed objects upon the same IMC, with one such object disposed in the higher pair of cradles, while the second such object is disposed perpendicularly upon the lower pair of cradles.

An additional advantage of such cradle configurations is the capability to support multiple objects disposed one above the other spanning multiple IMCs. For example, a plurality of rods may be supported by the cradle regions of multiple IMCs disposed on a work surface in a desired configuration, while planar objects may be disposed upon the apices of those same IMCs. Because the cradle of an IMC may serve as a location for joining multiple rods (e.g., dowels, pipes, etc.) at one or more angles relative to each other, multiple IMCs may be disposed to form a pattern of rods on a work surface with the capability to support multiple rods at each IMC. Conversely, the rods may instead be configured to maintain the IMCs in a desired pattern, for example, a square pattern of rods may be used to position and/or stabilize a set of IMCs in a square configuration, to support a larger planar object atop the multiple IMCs. In this regard, embodiments of the IMC may also include openings on sidewalls thereof to accommodate the ends of rods or other longitudinal objects.

Embodiments having cradle configurations may also be of particular benefit in stabilizing pipe fittings during the process of attachment, with such fittings disposed either directly above the IMC, or at locations between the IMCs. Additionally, the application to, and drying of, a pipe surface coating will be greatly assisted by such configurations which provide access to nearly the entire surface area of the pipe, while elevating it during the drying process to prevent the surface coating from sticking to a work surface.

In one or more embodiments, the ridges will have relatively vertical sidewalls to stably support an object when the IMC is fastened to a vertical surface (vertical sidewalls would provide a horizontal platform when the IMC is in a vertical orientation). In one embodiment, ridges will be configured to taper from bottom to top, such that the upper surface of a ridge will be substantially lower than a lower portion of the ridge. Such a configuration advantageously provides increased strength to a ridge, while minimizing the contact surface with a supported object.

Referring to FIGS. 4, 5A and 6, in various embodiments, fastening points 426, 526, 626 will be disposed at the bottom of a groove 428, 528, 628 to advantageously stabilize and orient a fastener during deployment. In one embodiment, fastening points 526 are disposed in a lower half of the IMC, to advantageously permit the use of shorter fasteners and/or greater penetration into a work surface. Grooves 528 may be larger than the fastening points 526 to advantageously accommodate and guide a screwdriver or drill during the process of deploying a fastener. In one embodiment, grooves 528 may be continuous with feet disposed on a bottom surface of the IMC. In one embodiment, separate feet may be configured to operatively connect to the fastening points 528 from beneath the IMC 500.

Apices 520 and ridges 522 may advantageously be configured with specific angular orientations respective to other apices 520 and ridges 522. For example, a three-ridge embodiment of an IMC, might be configured such that the ridges are offset 120-degrees from each other. Similarly four-ridge configurations might be offset 90-degrees from each other. Such configurations allow for the precise orientation of a first supported object relative to a second supported object, and may also be utilized to orient a larger configuration of objects relative to one another by utilizing multiple IMCs having the desired angular characteristics. In one embodiment, the angles will be indicated upon a surface of the IMC 500.

Embodiments of the IMC 500 may also be inter-connectible via configurations of tabs, tongue and groove configurations, male/female protrusions or any other configurations known in the art. Such inter-connectivity will advantageously permit a desired geometric pattern of IMCs. Such tabs and other interconnectivity elements may be configured to function as fastening points by accommodating a fastener. For example, the ends of a staple may be each disposed within the fastening points of two neighboring IMCs to maintain the IMCs in close proximity to one another, possibly while also fastening the IMCs to a work surface.

Figure 5C:
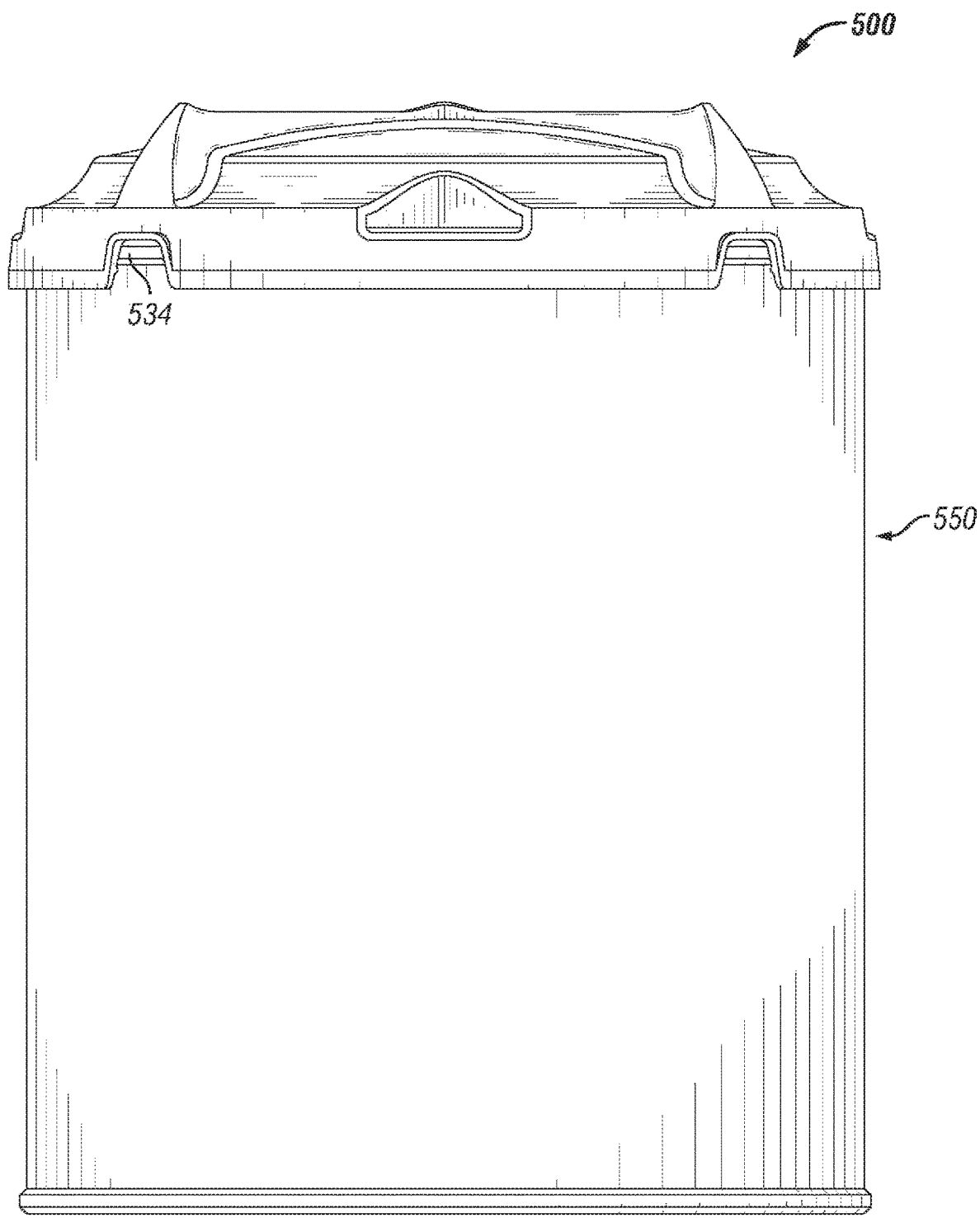
FIG. 5C shows one embodiment of an improved multifunctional cap, operatively connected to a container.

Embodiments of the IMC 500 may also be configured with a safety squeeze lock, pull tab and/or any other locking mechanism known in the art, including tamper-resistant configurations which require breakage or removal prior to use. As shown in FIGS. 5B and 5C, in one embodiment, a gap 534 may be disposed along the lower periphery to advantageously permit the insertion of a tool between the IMC 500 and an operatively connected can 550, to facilitate removal of the IMC 500 from the can 550. A protective seal or cover may also be utilized to protect the IMC and prevent separation of the IMC and an operatively connected can. Such a seal or cover may operatively connect to both the IMC and can and may be configured as e.g., a cellophane wrap or other resilient cover material.

In one embodiment, pairs of spatially-displaced apices may be configured to operatively connect to the ends of a roller element such that the roller element forms a rotatable ridge disposed between the pair of apices. In one embodiment, such a roller element will be absorbent and may be utilized to apply surface coatings in a manner similar to that of a paint roller. Embodiments may also include a protruding flange extending from the outer periphery of the IMC to catch excess drippings, and may also include a plurality of rollers to permit movement of a supported object in multiple directions. In one embodiment, an opening may be disposed beneath the area to be occupied by a roller, in communication with an inner cavity of the IMC, thereby permitting the IMC and roller combination, when affixed to an inverted container containing a surface coating, to apply such surface coating from the container to the surface of an object.

Embodiments of the apices may also include or be compatible with roller tips or low-friction tips to aid the user in moving an object supported thereby. For example, if a surface coating were being applied to a spherical object supported upon an IMC, and the user wished to rotate the object without lifting it from the IMC. Such embodiments may advantageously provide a user the option to "upgrade" an IMC to make it more suitable for a desired application. One significant advantage of embodiments of the IMC, is the capability to individually support an object with only a single unit. Whereas prior art small work surface stands generally include only a single peaked or flat contact surface, making it difficult to balance an object thereupon, embodiments of the IMC which include a plurality of such surfaces may be used individually to support an object.

To advantageously increase such capability, embodiments of the IMC may be configured with at least three apices disposed some distance apart in a pattern selected to stably distribute the load of an object upon the IMC. In one embodiment, such distance will be at least one-third of the diameter of the IMC. For example, if the diameter of the IMC is 6", the centers of the upper surfaces of the apices will be disposed at least 2" apart.

The various configurations of ridges described herein may have a relatively planar surface, or include a desired curvature. Furthermore, such ridges may be relatively horizontal, or sloped. Horizontal configurations provide increased contact areas for supporting flat objects, while sloped configurations may provide a desired bias to a non-planar object, generally toward the center of the IMC, to prevent the object from rolling off of the IMC when supported thereby.

Embodiments of the IMC may comprise any material or combinations thereof known in the art. These may typically include, but are not limited to, various plastics, metals, and elastomers. In one embodiment, the IMC may be formed of plastic in combination with an elastomeric material disposed at a lower end (532 in FIGS. 5A-5B) to advantageously provide a greater stability to the IMC, as well as some shock-absorbing characteristics. Such multi-material configurations may be manufactured via dual-shot/multi-shot molds. Additionally, multi-cavity molds may be utilized to produce multiple IMCs in parallel, thereby increasing volume of production and decreasing production times.

Other elastomeric surfaces may be added to various locations of the IMC, including the apices, to e.g., increase stability, decrease slippage of a supported object, and improve gripping surfaces for a user. Wall thickness of an IMC, or various components thereof, may vary and may be selected based upon a desired durability, cost, use, and/or capacity. Embodiments of the IMC, particularly those configured to nest, may be manufactured without any negative draft angles to advantageously facilitate removal from the mold.

Embodiments of the IMC may also be constructed of multiple, separately formed components. For example, a plastic body may be operatively connected to an elastomeric base and/or elastomeric elements may be operatively connected to apices at predetermined locations on the plastic body. In one embodiment, holes or slots may be formed in the apices, to operatively connect tips configured to have a desired contact characteristic with an object. For example the tips may be elastomeric, pointed, round, textured, and/or replaceable or interchangeable. Alternatively, nails, rods, or other elongated objects may be positioned in holes disposed in the apices, to facilitate a minimal contact area and increased accessibility to a supported object.

Figure 7A:
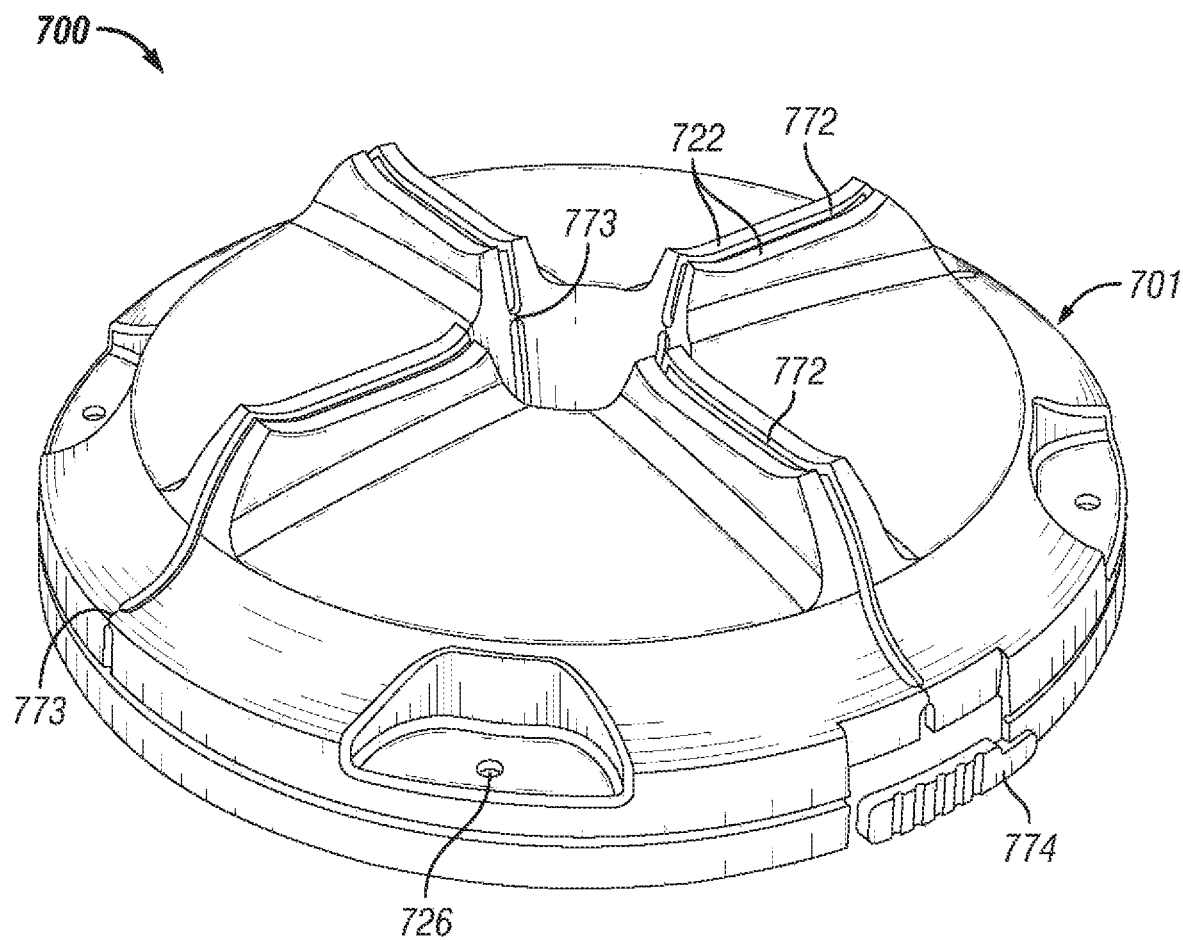
FIG. 7A shows on embodiment of an IMC, having separable segments
FIG. 7B show one embodiment of an improved multifunctional cap, having three apices, in use supporting a spherical object.

As shown in the embodiment of FIG. 7A, the IMC 700 may comprise a plurality of operatively connected segments 701, separated by seams 772. In radially-segmented configurations such as the one shown, the seams 772 will generally have a radial orientation and may be disposed along a radial ridge 722, or alternatively may be formed between ridges (not shown). When seams 772 are disposed along a radial ridge 722, each segment 701 of the IMC 700 will be bordered by a pair of radial ridges 722. When seams are disposed between ridges, each segment 701 of the IMC may include only a single ridge. Alternatively, each segment 701 may include multiple ridges when, for example, the number of seams is less than the number of ridges, as when an IMC is bisected by a seam, and includes four radial ridges, resulting in two ridges on each segment 701 when the segments 701 are separated.

Seams 772 will generally extend from a center of the IMC 700 to the periphery thereof, although they need not be continuous from center to periphery. For example, a seam 772 may be interrupted by one or more bridges 773 that span the seam and operatively connect adjacent segments 701 of the IMC 700. The bridges 773 will generally be configured to be broken by a user when separation of segments 701 is desired. Other elements, such as a circular peripheral tab 774 may be utilized to reversibly retain the segments 701 in their original configuration and may also function to operatively connect the IMC 700 to a can. A bridge 773 may comprise any structure known in the art for reversibly connecting two similar elements in a desired configuration, including but not limited to tongue and groove configurations and/or paired mating elements.

Seams 772 may also be configured to be broken along a crease line disposed between the segments 701. Such a configuration would require neither a gap between adjacent segments 701 nor a bridge 773.

One significant advantage of embodiments of the IMC, is the capability to individually support an object with only a single unit. Whereas prior art small work surface stands generally include only a single peaked or flat contact surface, making it difficult to balance an object thereupon, embodiments of the IMC which include a plurality of such surfaces may be used individually to support an object.

To advantageously increase such capability, embodiments of the IMC may be configured with at least three apices disposed some distance apart in a pattern selected to stably distribute the load of an object upon the IMC. In one embodiment, such distance will be at least one-third of the diameter of the IMC. For example, if the diameter of the IMC is 6", the centers of the upper surfaces of the apices will be disposed at least 2" apart.

The various configurations of ridges described herein may have a relatively planar surface, or include a desired curvature. Furthermore, such ridges may be relatively horizontal, or sloped. Horizontal configurations provide increased contact areas for supporting flat objects, while sloped configurations may provide a desired bias to a non-planar object, generally toward the center of the IMC, to prevent the object from rolling off of the IMC when supported thereby.

Figure 7B:
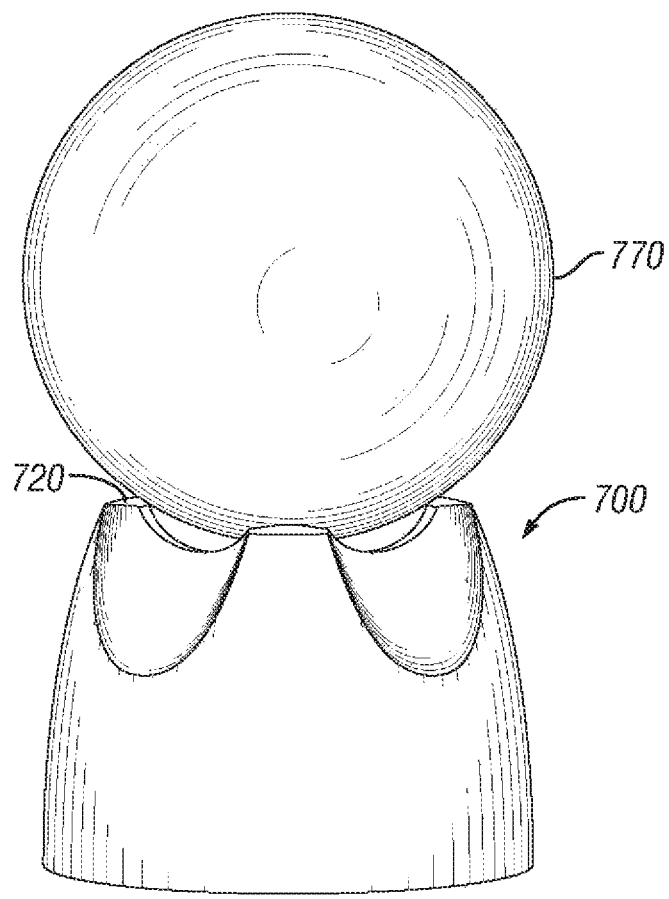
FIG. 7C shows one embodiment of an IMC, supporting a corner of an object between apices.
FIG. 7D shows one embodiment of a separable segment of an improved multifunctional cap.

As shown in FIG. 7B, to advantageously increase such capability, embodiments of the IMC 700 may be configured with at least three apices 720 disposed some distance apart in a pattern selected to stably distribute the load of an object 770 upon the IMC 700. In one embodiment, such distance will be at least one-third of the diameter of the IMC 700. For example, if the diameter of the IMC 700 is 3", the centers of the upper surfaces of the apices 720 will be disposed at least 1" apart.

Figure 7C:
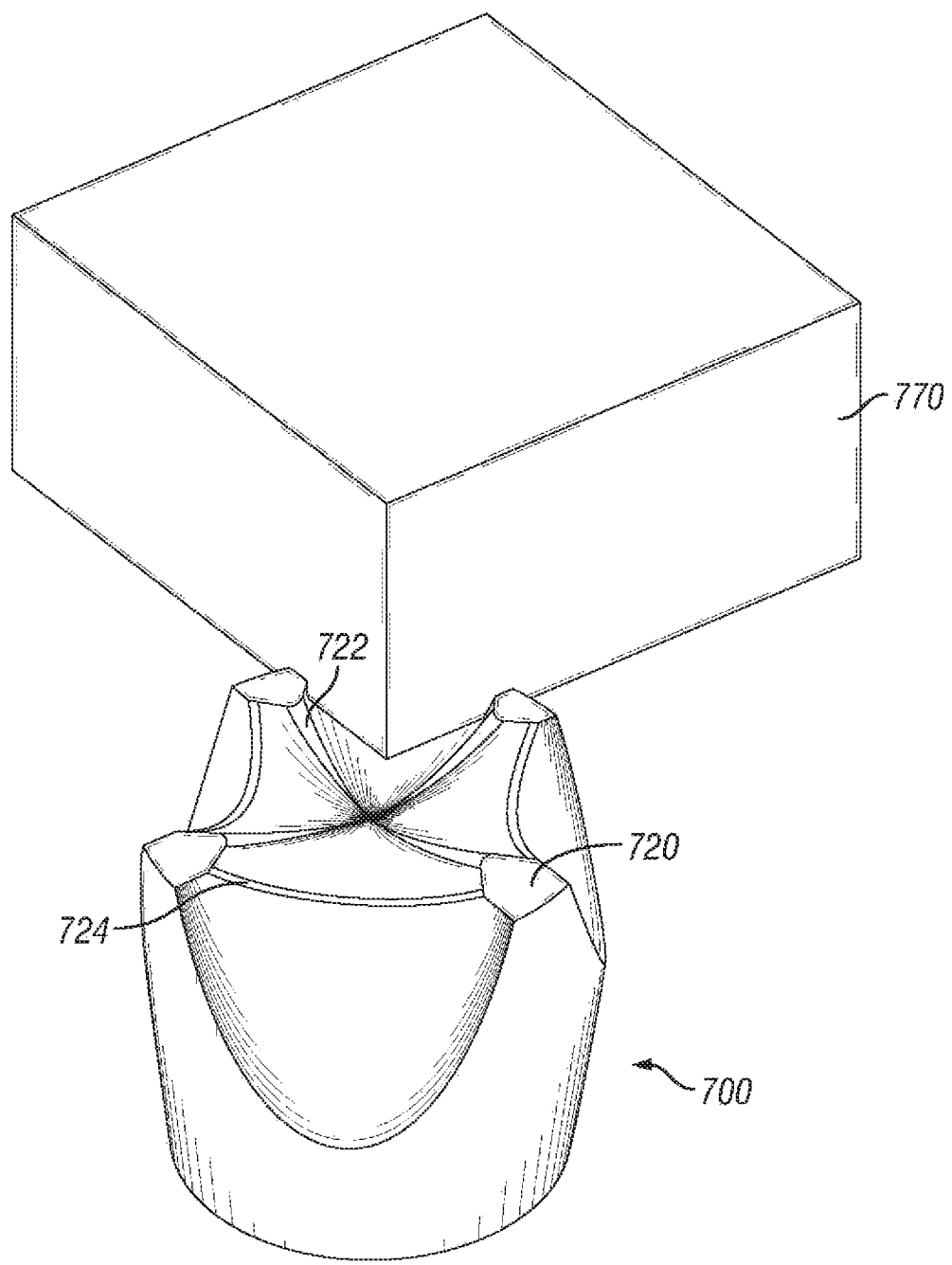

As shown in FIG. 7C, the corner of a supported object 770 may be supported by the cradle and/or central region of the IMC 700 and when positioned between the apices 720 will advantageously be prevented from slipping laterally, as the apices 720 provide lateral stability.

Figure 7D:
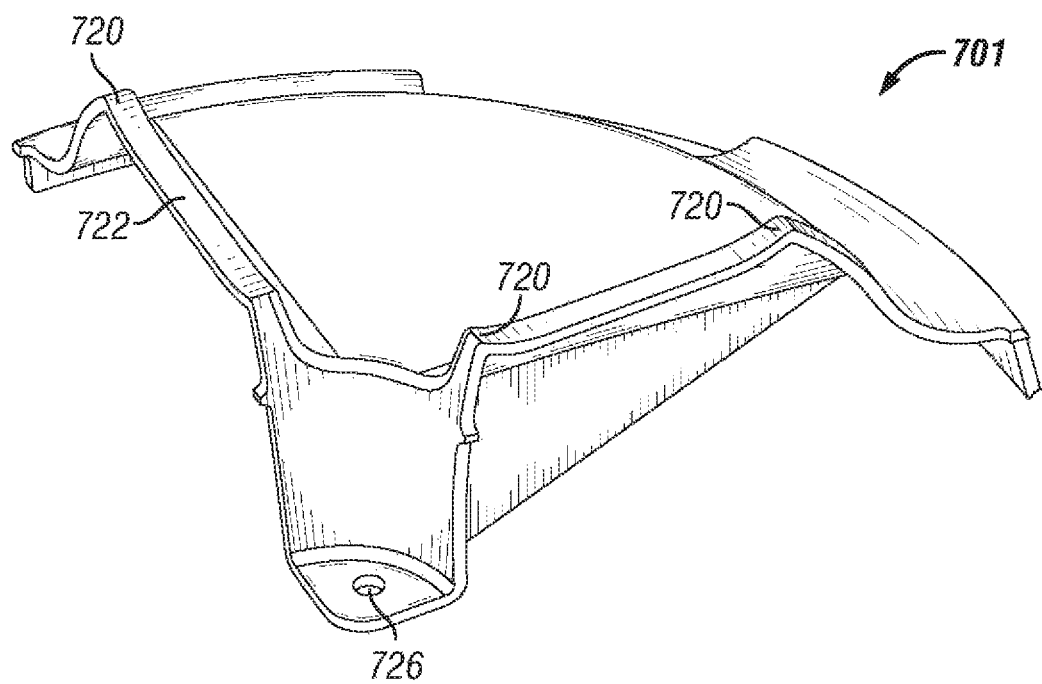

As shown in the embodiment of FIG. 7D, a segment 701 of an IMC 700 is advantageously configured to operate independently of other segments when utilized to support an object above a work surface. Such a configuration allows a single IMC 700 to provide a plurality of work support elements in the form of separable segments 701, each of which may individually provide a support function via one or more ridges 722 and apices 720, and each of which may be individually fastened to a work surface via one or more fastening points 726. The inner region of a segment 701 may include one or more fastening points at one or more sunken locations, and such locations may be disposed at a depth similar to that of a lower peripheral region of the segment 701, advantageously permitting the segment 701 to rest stably upon a work surface. In one embodiment, a ridge 722 will include a sunken linear panel disposed substantially therebeneath and within the cavity of the IMC, to provide greater stability and strength along the ridge line, as the panel will be in contact with a work surface when the segment 701 is placed thereupon.

Figure 8:
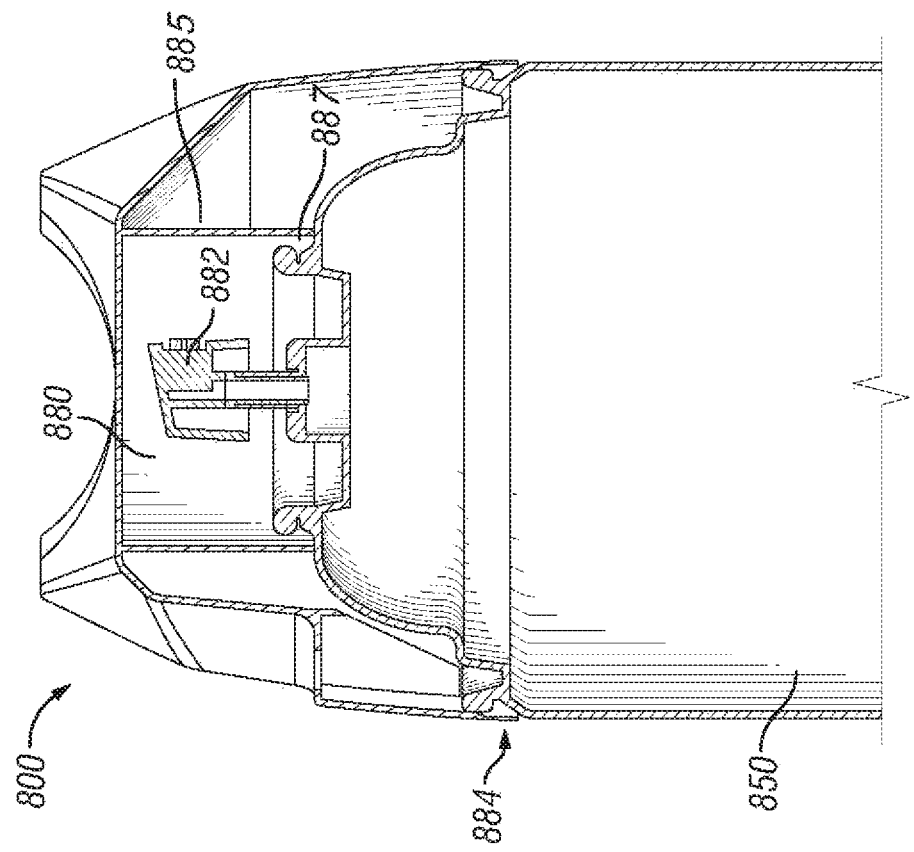
FIG. 8 shows one embodiment of an improved multifunctional cap, operatively connected to a spray can.

As shown in the embodiment of FIG. 8, the lower section will generally have a substantially hollow interior, often configured with various elements such as an isolation cavity 880 to accommodate and isolate an actuator 882 of an operatively-connected can 850, as well as a number of support walls and ridges to lend strength and rigidity to the IMC 800. In one embodiment, the inner wall 885 separating the isolation cavity (or actuator cavity) 880 may include at least one connection element located near 887 to operatively connect the IMC to the portion of the can 850 surrounding the actuator 882, either in place of, or in addition to, a connection element 884 formed along the outer wall of the IMC. The connection elements 884 may be formed on an inner surface, or an outer surface, of any wall of the IMC 800, depending on a predetermined can configuration and preferred mating locations.

The lower section of the IMC 800 may comprise one or more connection elements 884 for operatively and reversibly connecting to a can 850 in a predetermined manner. Such connection elements 884 may be of any type known in the art and may be located at discrete points along the circumference, or along the entire circumference, of the IMC 800. The connection elements 884 may comprise threads, clips and other friction elements, or any other configurations known in the art for achieving such an operative connection. Connection elements 884 may be disposed on internal or external surfaces of the IMC 800, or a combination thereof Alternatively, the connection elements 884 may be located at an inner wall of the IMC 800 and configured to mate with a raised portion of the can surrounding the actuator 882. While connection elements 884 are shown in an inward-facing configuration, they may also be configured to be outward-facing depending on the configuration of can to which they will connect. Similarly, connection elements 884 need not be located along the lowest margin of a wall, but instead may be located at varying heights based on a predetermined can configuration. In one embodiment, an IMC 800 may include multiple types, locations, and configurations of connection elements 884 to ensure compatibility with various can configurations. In various embodiments, the lower edge of the IMC 800 will be configured to rest stably upon a flat work surface. Connection elements 884 may also be utilized to operatively connect an IMC 800 to a weighted base to provide an increased stability in use.

Figure 9:
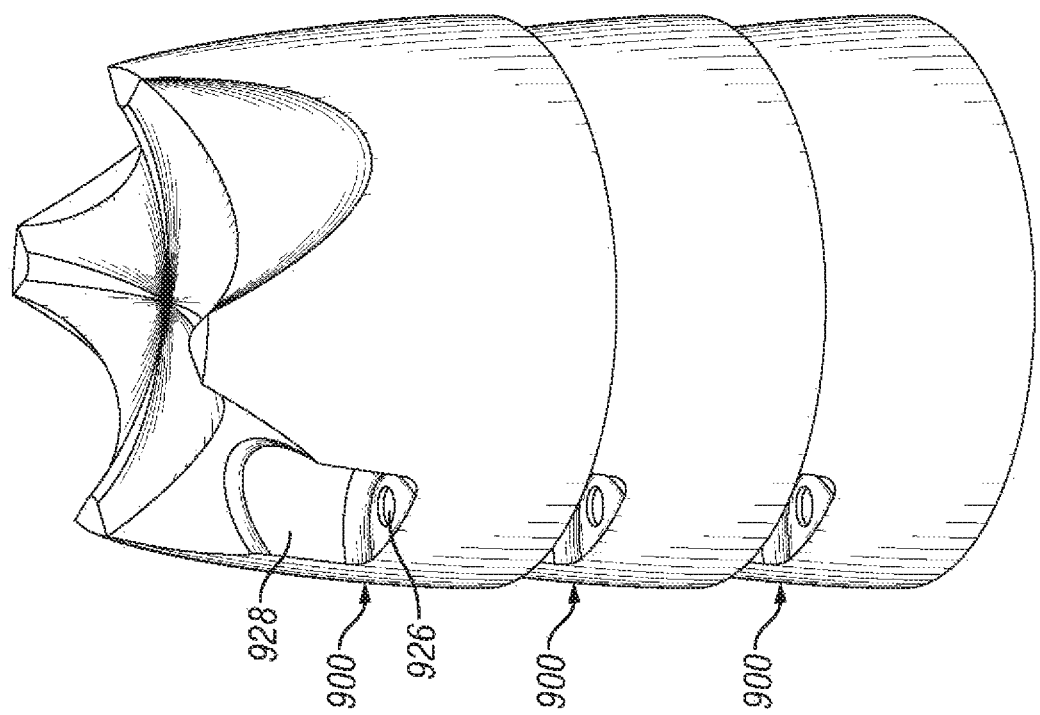
FIG. 9 shows one embodiment of an improved multifunctional cap, in a nested configuration.

As shown in FIG. 9, embodiments of the IMC 900 may be configured to taper from a wider lower region to a narrower upper region to advantageously permit nesting and stacking of multiple IMCs 900. Various elements, including ridges 920, grooves 928, etc., will similarly taper to facilitate tighter nesting. Nesting and stackability provide numerous advantages including easier storage, connection of multiple IMCs to a single can to form a kit or achieve a desired height, and deployment of stacked IMCs on a work surface to achieve a desired support height and/or combination of desired supported heights for supported objects.

In one embodiment, an outer surface of the IMC will be configured to reversibly connect to an inner surface of a second IMC, to advantageously provide a reversible locking configuration of multiple IMCs, permitting a stack of IMCs to be used and moved as a unit. This can be accomplished by utilizing connection elements configured to also connect to a can, or by means of an independent set of connection elements. Such connection elements may be frictional, threaded, or of any other type known in the art. In one embodiment, segments 701 of the IMC may be individually configured to nest at least partially within other segments 701, in a stable manner.

In one embodiment, an upper section of the IMC may be configured to operatively connect to a lower section of a can, thereby advantageously permitting cans to be stacked upon one another, in a stable manner. Embodiments of the IMC may be included in place of, or in addition to, traditional caps/lids. For example, an IMC may be configured to seal a container, or may be operatively connected to a container having an existing cap/lid that provides a seal. In one embodiment, a lid of a container may be configured to operatively connect to an IMC, advantageously providing a base for the IMC.

While the IMC may be configured with any number of ridges and apices, 3-5 such support elements may advantageously provide a desired combination of single-unit functionality in combination with minimal contact surfaces (reduced obstruction). It may also be advantageous to ensure that all IMCs from a particular source have similar or identical characteristics, to ensure interoperability, including uniform height of apices and/or ridge configurations, and inter-connectible connection elements.

While the IMC may have any dimensions suited for its intended use, a configuration wherein the height of the IMC is substantially less than its width may advantageously provide an increased stability for the IMC's supportive functions. In one embodiment, such a substantially greater width shall mean that the width is at least twice the height, as measured at the widest and highest points, respectively. In one embodiment, such width will be at least three times the height.

In one embodiment, the IMC may comprise one or more cavities disposed on a lower side thereof, such that they are substantially enclosed between an IMC and an operatively connected can or work surface. Such cavities may be configured to contain sponges or other devices for applying a surface coating, and may be circular, or configured to maximize the useable space under one or more segments of an IMC. Such cavities may include supportive sidewalls for providing structural rigidity to the IMC when connected to a can or work surface.

As used herein, the term "apex" (plural "apices") shall mean a high point relative to surrounding structure. While the highest point(s) of an IMC will generally be apices, additional apices may be formed at a secondary height, so long as they are the highest points relative to immediately surrounding structure. For example, a first ridge may terminate at a first pair of apices at either end, while a second ridge may terminate at a second pair of apices at either end, and the first and second pairs of apices may have differing heights. Other meanings of the term within the spirit of the invention may also apply.

As used herein, the term "radial" as applied to a ridge, has a preferred meaning of extending along at least a portion of an imaginary line extending from the center of the IMC toward a point on the periphery of the IMC. A radial ridge may have a length greater than that of the radius of the IMC. An "extended radial ridge" as used herein means that such a ridge is disposed such that it extends from a first half of the IMC, across the center and into a second half of the IMC. As used herein, the term "peripheral" as applied to a ridge, has a preferred meaning of being generally aligned in a direction that corresponds to an peripheral border of the IMC. Any combination of radial and/or peripheral ridges may be utilized with various embodiment of the IMC.

As used herein, the term "substantially equidistant" has a preferred meaning of having less than 20% variation in distance, and more preferably less than 10% variation in distance. The terms "lower section" and "upper section" are terms of convenience utilized herein to identify functional regions of the IMC. Generally, the lower section will include elements for connecting to a container and/or connecting or resting upon a work surface, while the upper section will include elements for supporting an object.

As used herein, the term "central region" as applied to the IMC, has a preferred meaning of within an area bordered on its outer periphery by an imaginary line bisecting the radius of the IMC. As used herein, the term "peripheral region" as applied to the IMC, has a preferred meaning of outside an area bordered on its inner periphery by an imaginary line bisecting the radius of the IMC. The terms "proximal" and "distal," respectively, may be used to generally identify areas within such regions, and relative to the center of the IMC, with "proximal" being nearer the center, and "distal" being further from the center. Other meanings of these terms which do not conflict with the spirit of the invention may also apply.

The terms "circumference," "diameter," "radius," and variations thereof, as used in this application, may encompass non-circular applications corresponding to the concepts of a perimeter, or length, of non-circular elements, when such is clearly indicated by accompanying descriptive language. The scope of these terms may be further defined by exemplary reference elements in the drawings.

The terms "comprising," "including," and "having," as used in the claims and specification herein, indicate an open group that includes other elements or features not specified. The terms "a," "an" and the singular forms of words include the plural form of the same words, and the terms mean that one or more of something is provided. The terms "at least one" and "one or more" are used interchangeably.

The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of an embodiment.

As used herein, the terms "cavity" and "chamber" are synonymous and used to describe a hollow space, typically open or openable on at least one end or side.

While the embodiments disclosed herein are generally of the closed-style cap configuration, many of the novel elements disclosed herein may be deployed in open-style cap configurations. Furthermore, many novel features disclosed herein may be utilized with caps and lids for containers other than spray cans. While generally disclosed as having a circular base, embodiments of the invention may include a square base or any other shape known in the art. IMCs may have an overall cylindrical, oval, rectangular, square or other shape, (generally selected to conform to a predetermined can or container configuration) and such may vary among different sections of an IMC. Embodiments of the IMC may also include an upper section that is hingeably connected to a lower section to permit access to an interior space without removal of the IMC, when operatively connected to a can.

While generally described herein as a cap for a can, embodiments of the IMC may be configured for use with various other types of containers. Embodiments of the IMC may also include one or more openings disposed in an outer wall thereof, configured to permit the entry of a rod or similar element. In one embodiment, such openings shall be offset from the cradles such that objects supported by the openings would have a different orientation than those supported by the cradles, thereby advantageously providing an increased selection of orientations for supported objects.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for supporting an object above a work surface, comprising:
    providing an improved multifunctional cap (IMC) comprising a lower section and an upper section, wherein the lower section comprises:
        (a) at least one connection element disposed proximal a periphery thereof and selected to operatively connect to an upper region of a predetermined container, and
        (b) a base configured to rest stably upon a planar work surface when the IMC is detached from the predetermined container; and
        wherein the upper section comprises a plurality of vertically-elevated support elements, at least two of the support elements having a substantially identical height and configuration, including a peripheral wall extending upwardly from, and continuous with, an inwardly-tapering portion of a peripheral wall of the base, and an upper surface sloping downwardly towards the center of IMC;
    disposing the IMC upon the planar work surface such that base of the lower section is stably supported by the work surface; and
    placing the object on the IMC, such that the object is substantially supported by at least two of the support elements.

2. The method of claim 1, wherein providing the IMC comprises providing an operatively connected predetermined container and wherein the method further comprises the step of disconnecting the IMC from the predetermined container prior to disposing the IMC upon the planar work surface.

3. The method of claim 1, further comprising the step of separating a first segment of the IMC from a second segment of the IMC prior to disposing the IMC upon the planar work surface, wherein the first segment and the second segment each includes at least one of the support elements.

4. The method of claim 3, wherein disposing the IMC upon the planar work surface comprises positioning the first segment and the second element at separate locations on the planar work surface.

5. The method of claim 4, wherein placing the object on the IMC comprises positioning the object such that it is substantially supported above the work surface by the support elements of the first segment and of the second segment.

6. The method of claim 1, wherein placing the object on the IMC comprises positioning the object such that it is substantially supported by at least two similarly-configured apices of the IMC.

7. The method of claim 1, wherein placing the object on the IMC comprises positioning the object such that it is substantially supported by at least two similarly-configured ridges of the IMC.

8. The method of claim 1, further comprising the steps of (a) providing a second, substantially identical IMC, (b) disposing the plurality of substantially identical IMCs at different locations upon the planar work surface, and (c) positioning the object such that it is substantially supported above the planar work surface by the support elements of the plurality of IMCs.

9. The method of claim 8, wherein the disposing of the plurality of substantially identical IMCs further comprises orienting at least two of the IMCs upon the work surface such that selected support elements of at least two IMCs are aligned to correspond to the shape of the object, prior to positioning the object upon the at least two IMCs.

10. The method of claim 1, further comprising the steps of (a) providing a second, substantially identical IMC, wherein each IMC includes a cavity formed in the bottom thereof, the cavity having an internal configuration that substantially conforms to an outer configuration of the upper section, and (b) nesting the plurality of IMCs such that the upper section of the lower IMC is substantially contained within the cavity of the upper IMC.

11. The method of claim 10, further comprising repeating the providing and nesting steps to form a stack of nested IMCs upon the work surface and increasing the height of the stack until the support elements of the top IMC are at a desired height above the work surface, prior to placing the object on the IMC.

12. The method of claim 1, further comprising fastening the IMC to the work surface by passing a fastener through a fastening element disposed in the base portion.

13. A kit for the application of surface coatings, comprising:
    a can, containing the surface coating; and
    at least one improved multifunctional cap, configured to reversibly connect to the can, and comprising a cavity, wherein an uppermost surface of the improved multifunctional cap comprises a plurality of raised apices, at least one selected from the plurality of raised apices representing at least one highest point(s) of the improved multifunctional cap, at least two selected from the plurality of raised apices disposed proximal to, and substantially continuous with, an inwardly-tapering portion of an outer perimeter wall of the cap, and a plurality of sloping ridges connected to the plurality of raised apices.

14. The kit of claim 13, wherein the at least one improved multifunctional cap is operatively connected to the can.

15. The kit of claim 14, further comprising a weighted base, disposed between the can and the at least one improved multifunctional cap.

16. The kit of claim 13, wherein the cavity of the at least one improved multifunctional cap is configured to accept an actuator disposed atop the can.

17. The kit of claim 13, wherein at least one wall surrounding the cavity comprises at least one connection element.

18. The kit of claim 13, further comprising at least one reversibly connectable weighted base.

19. The kit of claim 13, wherein the at least one improved multifunctional cap comprises a plurality of separable, substantially-identical segments.

20. The kit of claim 13, further comprising at least one fastener for fastening the improved multifunctional cap to a work surface.

21. A method of manufacturing an improved multifunctional cap (IMC), comprising:
    within at least one cavity of a mold:
        forming an upper section comprising a plurality of raised apices, at least two of which have a substantially indentical height and are connected via a raised ridge;
        forming a lower section having a base portion selected to approximate the shape of a predetermined can top;
        forming at least one chamber within the lower section and at least partially continuous with an inner portion of the upper section; and
        forming at least one connection element in at least one wall surrounding the at least one chamber, the at least one connection element configured to operatively connect the IMC to the predetermined can top.

22. The method of claim 21, wherein the forming occurs in a multi-shot mold utilizing a plurality of materials.

23. The method of claim 21, wherein the mold comprises multiple, substantially-identical cavities.

24. The method of claim 21, wherein the at least one chamber comprises an inner chamber sized to accept a predetermined actuator configuration, and an outer chamber extending between an outer wall of the inner chamber, and an inner wall of the base portion.

25. The method of claim 24, wherein the at least one connection element is formed in the wall bounding the inner chamber.

26. The method of claim 21, wherein each cavity is configured to form the IMC in separable, substantially identical, operatively connected segments and wherein each of the segments includes at least one apex and at least one ridge.

* * * * *